Patented Sept. 4, 1923.

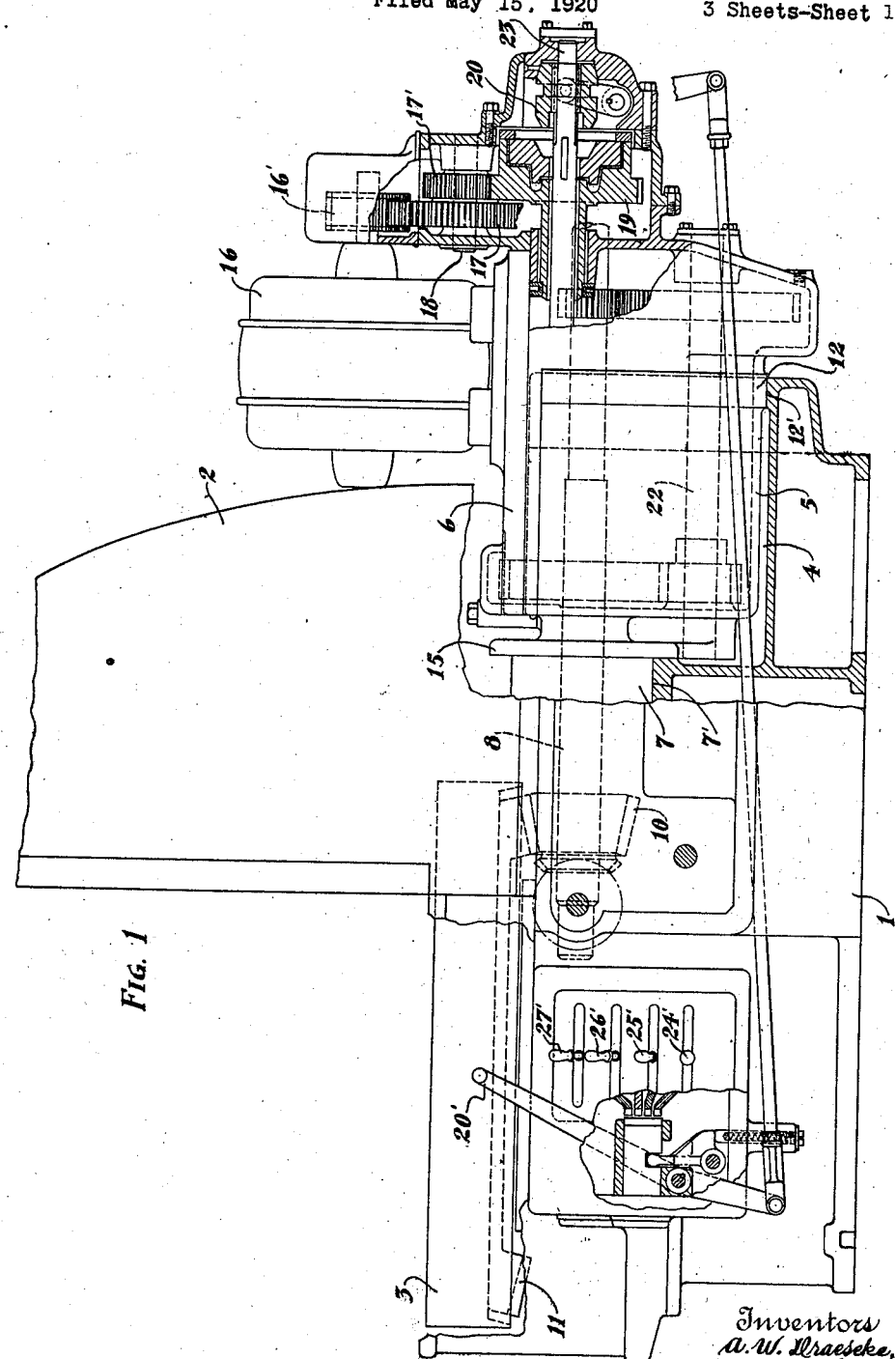

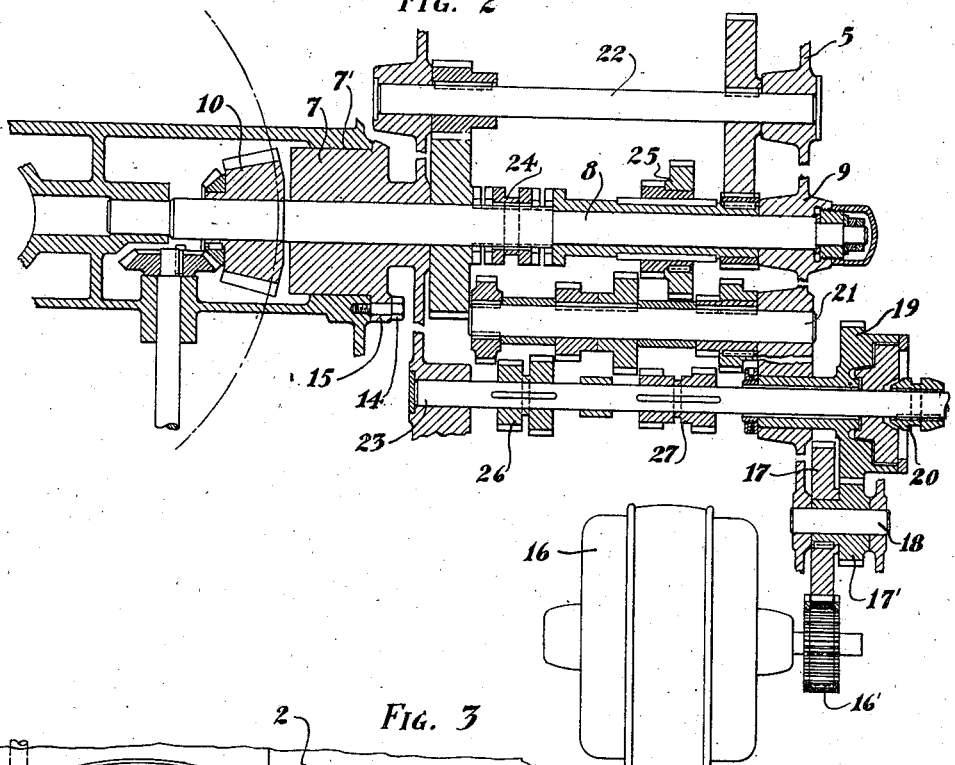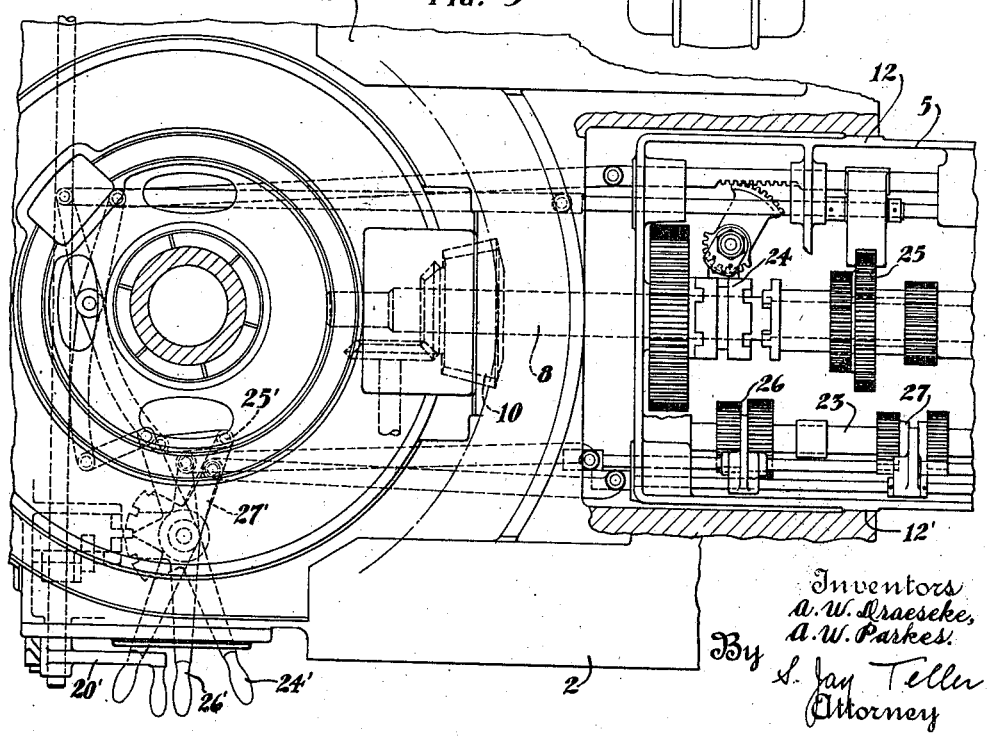

1,466,818

UNITED STATES PATENT OFFICE.

ALFRED W. DRAESEKE AND ALBERT W. PARKES, OF DUNDAS, ONTARIO, CANADA, ASSIGNORS TO NILES-BEMENT-POND COMPANY, OF NEW YORK, N. Y., A CORPORATION OF NEW JERSEY.

BORING MILL.

Application filed May 15, 1920. Serial No. 381,609.

*To all whom it may concern:*

Be it known that we, ALFRED W. DRAESEKE and ALBERT W. PARKES, subjects of the King of Great Britain, residing at Dundas, in the Province of Ontario and Dominion of Canada, have invented certain new and useful Improvements in Boring Mills, of which the following is a specification.

This invention relates to boring mills and particularly to the driving mechanism therefor, the general object of the invention being to improve the mounting of such mechanism within the machine.

It is an object of the invention to enclose the table drive change speed gearing compactly within a casing or cradle and to mount this cradle in a novel and improved manner within an opening formed in the base of the machine. It is also an object of the invention to provide a mounting of such character that the cradle will normally accurately align itself into table driving position within the said opening thereby rendering careful and accurate manual alignment of the cradle unnecessary and erroneous alignment and positioning thereof impossible.

Another object of the invention is to mount the cradle and the table driving shaft and gearing in such a manner that any transverse movement of the cradle on its supports within the base of the machine will be about the said driving shaft as a center, whereby any such movement will not interfere with the driving of the table.

With the above and other objects in view which will appear as the description proceeds the invention will now be described by reference to the drawings wherein:

Figure 1 is a side elevation of a boring mill embodying the present invention, certain portions thereof being broken away to more clearly illustrate the construction.

Fig. 2 is a diagrammatic view illustrating the table driving mechanism including the change speed gearing.

Fig. 3 is a plan view of the table driving mechanism, the work table and the gear box cover plate being removed to show the construction of such mechanism.

Figure 4:
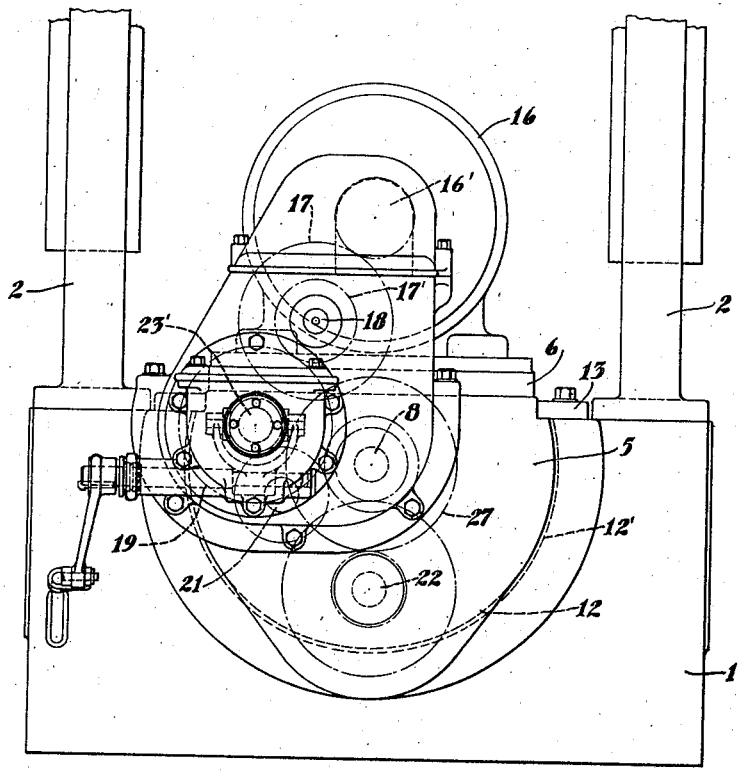
Fig. 4 is an end elevation of the boring mill showing the mounting of the table driving mechanism and the cradle within the base of the machine.

The invention herein has been shown as embodied in a vertical boring mill of the type illustrated, it being understood, however, that the same is not necessarily limited thereto but may be modified within the scope of the appended claims. In the drawings, 1 indicates the base or bed of the machine rising from which are shown two tool-supporting uprights 2. The usual rotary work table 3 is mounted on the base in front of these uprights and is adapted to be driven by the mechanism to be hereinafter described.

Briefly the invention comprises the mounting of the table driving mechanism of a boring mill very compactly within a casing which is itself mounted within an opening formed in the base of the machine and in such manner that any transverse movement of the said casing will not affect the operation of the said mechanism. We preferably provide an opening 4 in the base of the machine, between the uprights 2 in the machine illustrated, which opening is adapted to receive therein the cradle or casing 5. The lower portion of this cradle is preferably curved transversely to a partly-cylindrical form, the upper portion thereof being open and adapted to receive the cover plate 6 thereon. The inner end of the cradle is preferably formed with a projecting transversely curved portion 7 which serves both as a support for the cradle and as one bearing for the table drive shaft 8, another bearing for such shaft being provided at 9 at the outer end of the cradle. Other bearings for the change speed gearing shafts are also provided in the end walls of the cradle as shown. The table 3 is rotated by means of the gear 10 on the drive shaft 8, which gear meshes with the table gear 11.

The cradle is shown as supported at its inner and outer ends, although it will be obvious that the same may be supported along its entire length if desired. The inner support of the cradle comprises the portion 7 already referred to and the outer support comprises a preferably transversely circularly curved portion 12, these portions of the cradle being each adapted to rest respectively on complemental surfaces 7′ and 12′ in the base opening 4. As heretofore stated, these supporting surfaces are preferably curved transversely and, as shown in Fig. 4, the table drive shaft 8 is mounted centrally of the cradle. The said supporting surfaces are preferably concentrically arranged or substantially so arranged about the shaft 8 whereby any transverse movement of the cradle on its supporting surfaces will be about the shaft 8 as a center and thereby have no effect on the aligning or driving position of such shaft. As seen in Figs. 1 and 4, we have illustrated the cradle as being cylindrically curved and of a cross-sectional form greater than a semi-cylinder. The complemental supporting surfaces 12 and 12', as seen in Fig. 4, being of greater extent than 180° prevent the upward movement of the cradle from the base and permit the cradle to be inserted and removed from the base opening 4 only by an endwise movement of the cradle. The cradle may be secured in position by means of clamping pieces 13 engaging the edges of the cradle and by bolts 14 extending through a flange 15 on the projection 7 of the cradle and into the frame of the machine.

In the drawings we have illustrated the driver or power means as comprising a motor 16 mounted directly on the cradle and operating through a gear 16' and gears 17 and 17' on a counter shaft 18 to drive a gear element 19 mounted on one shaft of the speed change gearing. We preferably provide a friction clutch 20 between the motor and change speed mechanism and operate the same by a handle 20' adjacent the table. In addition to the drive shaft 8 the change speed mechanism comprises the countershafts 21, 22 and 23 each of which has certain of the change speed gears mounted thereon as illustrated in the drawings. We have shown the sliding change speed elements as mounted on the shafts 8 and 23, although it will be clear that such details of the gearing may be modified without departing from the spirit of the invention. These sliding elements comprise the toothed clutch 24 and gear 25 both splined to the shaft 8 and the gears 26 and 27 splined to the shaft 23. These elements are adapted to be operated to control the speed of the machine by means of hand levers also mounted adjacent the table. As illustrated in Fig. 3, lever 24' controls the toothed clutch 24; lever 25' controls the slidable gear 25; lever 26' controls the slidable gear 26; and lever 27' controls the slidable gear 27. The connections between each slidable element and the lever controlling the same is clearly illustrated and further detailed description thereof is believed unnecessary.

It is thought that the construction and operation of the machine forming this invention will be clearly understood from the above description taken in connection with the drawings. Since the table drive shaft is mounted centrally in the cradle and the supports for the cradle are formed concentrically about such shaft, it will be seen that any transverse adjustment of the said cradle in its seat will be about the said shaft as a center and therefore will not affect the driving position nor the operation of the said shaft. When mounting the cradle in its support in the base of the machine the same will always automatically center itself to place the drive shaft in its proper aligning and driving position. It will therefore be seen that when the cradle is secured in the base of the machine the drive shaft 8 is always in the proper driving position. The invention therefore avoids the necessity of carefully aligning and positioning the table driving shaft and makes it impossible for such shaft to be out of alignment when the cradle is secured in the base of the machine.

What we claim is:

1. In a boring mill, the combination of a base, a rotatable work table thereon, mechanism for driving the table comprising a driver, change speed gearing and a table drive shaft adapted to be driven by the driver, a cradle having a transversely circularly curved exterior and having the change speed gearing mounted longitudinally therein, the said cradle being mounted in and supported by a complemental transversely curved cut-out portion of the base, and means engaging the edges of the cradle for securing the same in the base.

2. In a boring mill, the combination of a base, a rotatable work table thereon, mechanism for driving the table comprising a driver, change speed gearing and a table drive shaft adapted to be driven by the driver, a cradle having the change speed gearing and drive shaft mounted longitudinally therein, the said cradle being mounted in an opening formed in the base and having a transversely circularly curved supporting surface thereon extending transversely around the drive shaft and engaging a complemental supporting surface in the said opening, and means for securing the cradle in the base opening.

3. In a boring mill, the combination of a base, a rotatable work table thereon, mechanism for driving the table comprising a driver, change speed gearing and a table drive shaft adapted to be driven by the driver, a cradle having the change speed gearing and drive shaft mounted longitudinally therein, the said cradle being mounted in an opening formed in the base and having a transversely circularly curved supporting surface thereon extending transversely for more than 180° around the drive shaft and engaging a complemental supporting surface in the said opening whereby the cradle is held from bodily transverse movement in the base and can be inserted and removed therefrom only by an endwise movement of the cradle.

4. In a boring mill, the combination of a base, a rotatable work table thereon, mechanism for driving the table comprising a driver, change speed gearing and a table drive shaft adapted to be driven by the driver, a cradle having a partly cylindrical form and having the change speed gearing mounted longitudinally therein, the said cradle being mounted in and supported by a complemental partly cylindrical cut-out portion of the base, and means for securing the cradle in the base.

5. In a boring mill, the combination of a base, a rotatable work table thereon, mechanism for driving the table comprising a driver, change speed gearing and a table drive shaft adapted to be driven by the driver, a cylindrically curved cradle of a cross sectional form greater than a semicircle and having the change speed gearing mounted longitudinally therein, the said cradle being mounted in and supported by a complemental cut-out portion of the base, the arrangement of the cradle in the said base being such that the cradle can be inserted and removed therefrom only by an endwise movement of the cradle.

6. In a boring mill, the combination of a base, a rotatable work table thereon, mechanism for driving the table comprising a driver, change speed gearing and a table drive shaft adapted to be driven by the driver, a cradle provided with bearings in its end walls for supporting the drive shaft and change speed gearing shafts therein, the said cradle being mounted in an opening formed in the base and having a transversely circularly curved supporting surface thereon extending transversely around the drive shaft and engaging a complemental supporting surface in the said opening, and means for securing the cradle in the base opening.

7. In a boring mill, the combination of a base, a rotatable work table thereon, mechanism for driving the table comprising a driver, change speed gearing and a table drive shaft adapted to be driven by the driver, a cradle having the change speed gearing and drive shaft mounted longitudinally therein, the said cradle being mounted in an opening formed in the base and having a transversely circularly curved supporting surface at each end thereof extending transversely around the drive shaft and excaging complemental supporting surfaces in the said opening, and means for securing the cradle in the base opening.

8. In a boring mill, the combination of a base, a rotatable work table thereon, mechanism for driving the table comprising a driver, change speed gearing and a table drive shaft adapted to be driven by the driver, a cradle having a transversely curved supporting surface concentric with the drive shaft and having the drive shaft and change speed gearing mounted longitudinally therein, the said cradle being mounted in an opening formed in the base with its supporting surface engaging a complemental supporting surface in the said opening, and means for securing the cradle in the base opening.

9. In a boring mill, the combination of a base, a rotatable work table thereon, mechanism for driving the table comprising a driver, change speed gearing and a table drive shaft adapted to be driven by the driver, a cradle having at each end thereof a transversely curved supporting surface concentric with the drive shaft and having the drive shaft and change speed gearing mounted longitudinally therein, the said cradle being mounted in an opening formed in the base with its supporting surfaces engaging complemental supporting surfaces in the said opening, and means for securing the cradle in the base opening.

10. In a boring mill, the combination of a base, a rotatable work table thereon, mechanism for driving the table comprising a driver, change speed gearing and a table drive shaft adapted to be driven by the driver, a cradle having at its outer end a transversely curved supporting surface concentric with the drive shaft and having an extension at its inner end providing a drive shaft bearing and provided with a curved supporting surface also concentric with the drive shaft, the drive shaft and change speed gearing being mounted in the cradle and the cradle being mounted in an opening formed in the base with the said supporting surfaces engaging complemental supporting surfaces in the said opening, and means for securing the cradle in the base opening.

11. In a boring mill, the combination of a base, a rotatable work table thereon, mechanism for driving the table comprising change speed gearing and a table drive shaft, a cradle having the drive shaft and change speed gearing mounted longitudinally therein, driving means mounted on the cradle and operatively connected to the drive shaft through the change speed gearing, the said cradle being mounted in an opening formed in the base and having a transversely circularly curved supporting surface thereon extending transversely around the drive shaft and engaging a complemental supporting surface in the said opening, and means for securing the cradle in the base opening.

12. In a boring mill, the combination of a base and two uprights thereon, a rotatable work table, mechanism for driving the table comprising a driver, change speed gearing and a table drive shaft adapted to be driven by the driver, a cradle having the drive shaft and change speed gearing mounted longitudinally therein, the said cradle being mounted in an opening formed in the base between the said uprights and having a transversely circularly curved supporting surface thereon extending transversely around the drive shaft and engaging a complemental supporting surface in the said opening, the opening being open at the top whereby the cradle may be lowered thereinto, and means for securing the cradle in the base opening.

13. In a boring mill, the combination of a base and two uprights thereon, a rotatable work table, mechanism for driving the table comprising change speed gearing and a table drive shaft, a cradle having a transversely circularly curved supporting surface concentric with the drive shaft and having the drive shaft and change speed gearing mounted longitudinally therein, driving means mounted on the cradle and operatively connected to the drive shaft through the change speed gearing, the said cradle being mounted in an opening formed in the base with its supporting surface engaging a complemental supporting surface in the said opening, and means for securing the cradle in the base opening.

14. In a boring mill, the combination of a base, a rotatable work table thereon, mechanism for driving the table comprising a driver, change speed gearing and a table drive shaft, a cradle having the drive shaft and change speed gearing mounted longitudinally therein, the said cradle being mounted and supported in an opening formed in the base, means for securing the cradle in the base opening, and means adjacent the table for controlling the table driving mechanism.

15. In a boring mill, the combination of a base, a rotatable work table thereon, mechanism for driving the table comprising a driver, a clutch, change speed gearing and a table drive shaft, a cradle having the drive shaft and change speed gearing mounted longitudinally therein, the said cradle being mounted and supported in an opening formed in the base, means for securing the cradle in the base opening, and a clutch lever and change speed gearing levers adjacent the table for controlling the table driving mechanism.

In testimony whereof, we hereto affix our signatures.

ALFRED W. DRAESEKE.
ALBERT W. PARKES.

Witnesses:
F. P. NELSON,
JAS. IRWIN.